United States Patent
Gruber

(10) Patent No.: US 8,156,142 B2
(45) Date of Patent: Apr. 10, 2012

(54) SEMANTICALLY WEIGHTED SEARCHING IN A GOVERNED CORPUS OF TERMS

(75) Inventor: Jochen Gruber, Wiesloch (DE)

(73) Assignee: SAP AG, Walldorf (DE)

(*) Notice: Subject to any disclaimer, the term of this patent is extended or adjusted under 35 U.S.C. 154(b) by 650 days.

(21) Appl. No.: 12/340,782

(22) Filed: Dec. 22, 2008

(65) Prior Publication Data

US 2010/0161601 A1  Jun. 24, 2010

(51) Int. Cl.
*G06F 17/30* (2006.01)

(52) U.S. Cl. ........ 707/771; 707/706; 707/722; 707/736; 707/758; 707/E17.014; 707/E17.044; 704/1; 706/10; 706/12; 706/45

(58) Field of Classification Search .................. None
See application file for complete search history.

(56) References Cited

U.S. PATENT DOCUMENTS

| | | | | |
|---|---|---|---|---|
| 5,675,819 | A * | 10/1997 | Schuetze | 704/10 |
| 5,987,446 | A * | 11/1999 | Corey et al. | 1/1 |
| 6,098,033 | A * | 8/2000 | Richardson et al. | 704/1 |
| 6,173,261 | B1 * | 1/2001 | Arai et al. | 704/257 |
| 6,260,008 | B1 * | 7/2001 | Sanfilippo | 704/9 |
| 6,810,376 | B1 * | 10/2004 | Guan et al. | 704/9 |
| 7,043,474 | B2 * | 5/2006 | Mojsilovic et al. | 1/1 |
| 7,124,073 | B2 * | 10/2006 | Tokuda et al. | 704/2 |
| 7,743,010 | B2 * | 6/2010 | Paulus et al. | 706/46 |
| 7,945,525 | B2 * | 5/2011 | Ananthanarayanan et al. | 706/45 |
| 2003/0028564 | A1 * | 2/2003 | Sanfilippo | 707/513 |
| 2005/0143971 | A1 * | 6/2005 | Burstein et al. | 704/4 |
| 2009/0157656 | A1 * | 6/2009 | Chen et al. | 707/5 |

OTHER PUBLICATIONS

Dao et al, "Measuring Similarity between sentences", Oct. 2005.*
Islam et al, "Semantic Text Similarity Using Corpus-Based Word Similarity and String Similarity", ACM, Jul. 2008.*
Jensen et al, "Textual Similarity: Comparing texts in order to discover how closely they discuss the same topics", Kongens Lyngby, 2008.*
Li et al, "Sentence Similarity Based on Semantic Nets and Corpus Statistics", IEEE, Aug. 2006.*
Liu et al, "Measurig Semantic Similarity Within Sentences", Proceedings of the Seventh Conference on Machine Learning and Cybernetics, Kunming, Jul. 2008.*
Mihalcea et al, "Corpus-based and Knowledge-based Measures of Text Semantic Similarity", American Association for Artificial Intelligence, 2006.*
Ron Bekkerman, "Distributional Clustering of Words for Text Categorization", Haifa, 2003.*

(Continued)

*Primary Examiner* — Hung Le

(57) ABSTRACT

A method and system for conducting semantically weighted searches in a governed corpus of terms is provided. A search expression having a plurality of terms for performing a search in the governed corpus of terms is received. The governed corpus of terms comprises a plurality of corpus expressions each comprising a plurality of terms, each term within the governed corpus of terms being associated precisely with a single concept within a lexical database. At least one concept of the lexical database is assigned to each term in the search expression based on a syntactical analysis. A semantic similarity is calculated between pairs of concepts of the search expression and one of the corpus expressions. A total semantic similarity is calculated between the search expression and the one of the corpus expressions by aggregating the semantic similarities of the pairs of concepts based on an order of significance of the terms.

16 Claims, 4 Drawing Sheets

OTHER PUBLICATIONS

Budanitsky et al, "Evaluating WordNet-based Measures of Lexical Semantic Relatedness", University of Toronto, 2005.*
Gao et al, "Dependence Language Model for Information Retrieval", ACM, 2004.*
Danushka Bollegara, Yutaka Matsuo and Mitsuru Isizuka; An integrated approach to measuring Semantic Similarity between Words using Information available on the Web; Research Paper; Apr. 2007; The University of Tokyo, Yutaka Matsuo; Tokyo, Japan.
Y. Matar, E. Egyed-Zsigmond, S. Lajmi; KWSim: Concept Similarity Measure; Conference papers; May 2008; LIRIS Laboratory; Lyon, France.

* cited by examiner

SEMANTICALLY WEIGHTED SEARCHING IN A GOVERNED CORPUS OF TERMS

TECHNICAL FIELD

Embodiments of the invention generally relate to computer systems, and more particularly to methods and systems for conducting semantically weighted searches in a governed corpus of terms.

BACKGROUND

Traditional syntactic searches for expressions within corpus of terms suffer from a range of problems. For instance, homonymic terms are used in different meanings both within a corpus of terms being searched and by the searching agent. Consequently, many irrelevant results are returned which can be sorted out only by human inspection. The searching agent may use a synonym of terms contained in the corpus, thus not all relevant results are returned. The search agent may use hyponyms or hypernyms of terms contained in a corpus. So even in cases where no precise syntactic match is available in the corpus, some related terms may still be useful but will not be found due to rigidity of the current methods. One way to address some of these problems is if the search agents target the semantics of terms within a corpus instead of purely relying on syntactic similarities.

The search criteria and their target artifacts however are not always simple individual terms. Instead, both multi-term search expressions and multi-term target expressions in the corpus of terms are common. Determining semantic similarity between multi-term search expressions and multi-term target expressions in orders of magnitude is more complicated than working with single term expressions.

Thus there is a need for methods and systems that simplifies the retrieval of multi-term result expressions from a corpus of target multi-term expressions terms based on a quantified semantic similarity between the multi-term search expression and the multi-term target expressions in the corpus.

SUMMARY OF THE INVENTION

Embodiments of the invention are generally directed to a method and system for conducting semantically weighted searches in a governed corpus of terms. Each term of a multi-term corpus expression in a governed corpus of terms is assigned a concept. A search expression having a plurality of terms for performing a search in the governed corpus of terms is received, wherein the governed corpus of terms comprises a plurality of corpus expressions each comprising a plurality of terms. Each term within the governed corpus of terms is associated precisely with a single concept within a lexical database. Based on a syntactical analysis, at least one concept of the lexical database is assigned to each term in the search expression. A semantic similarity is calculated between pairs of concepts of the search expression and one of the corpus expressions, the pairs of concepts comprising a concept assigned to one of the terms in the search expression and a concept assigned to a correspondingly positioned term in the one of the corpus expressions. Calculating the semantic similarity includes finding out the distances of the two concepts from a common super concept and using the distances to calculate a similarity function (f). A weight is assigned to each of the terms in the corpus expression, the highest weight being assigned to the most significant term and the lowest weight being assigned to the least significant term. A total semantic similarity is calculated between the search expression and the one of the corpus expressions by aggregating the semantic similarities of the pairs of concepts based on an order of significance of the terms. This includes applying a total similarity function (g) that determines the total semantic similarity by providing a semantic significance to the semantic similarity between pairs of concepts in decreasing order of the weights of the terms related to the concepts, the semantic similarities between concepts related to terms with highest assigned weights being provided with the highest semantic significance. If the value of the total semantic similarity is less than a predefined threshold value, the one of the corpus expressions is designated as not related to the search expression. If the value of the total semantic similarity is greater than the threshold value, the one of the corpus expression is designated as being related to the search expression.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings. The invention is illustrated by way of example and not by way of limitation in the figures of the accompanying drawings. It should be noted that references to "an" or "one" embodiment in this disclosure are not necessarily to the same embodiment, and such references mean at least one.

DETAILED DESCRIPTION

Figure 1:
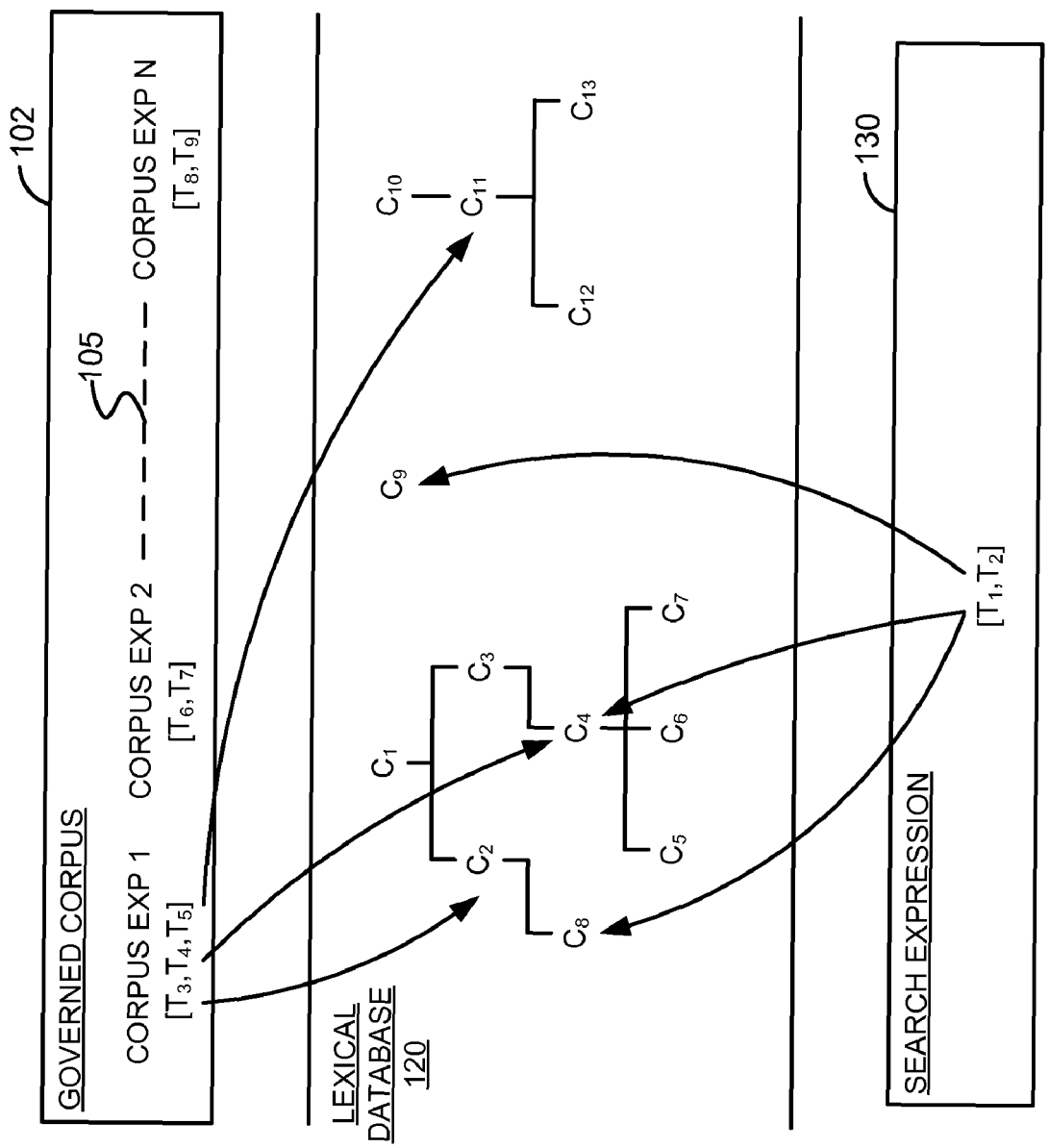
FIG. 1 illustrates a diagram for semantically weighted searching in a governed corpus of terms according to an embodiment of the invention.

FIG. 1 illustrates a diagram for semantically weighted searching in a governed corpus of terms according to an embodiment of the invention. Lexical database 120 is a collection of terms or words for a language. Terms in the lexical database 120 have concepts assigned to them. A concept is a precise definition of the term it is assigned to. A term in the lexical database 120 may have other terms in the lexical database 120 that it is related to as synonyms (i.e., equivalent in meaning), homonyms (i.e., pronounced or spelt in the same way), hypernyms (i.e., generalization of the term also referred to as a super concept), hyponyms (i.e., specialization of the term) of the term. Concepts provide semantic identity to the terms in the lexical database 120 by defining their meanings and help differentiate terms clearly from their homonyms, hypernyms or hyponyms. A term in the lexical database 120 may have more than one meaning and thus may have more than one concept assigned to it. A single concept may also be assigned to two or more terms in a lexical database 120.

The concepts in a lexical database 120 can be arranged in a hierarchical structure with concepts of a hypernym of a term being arranged higher in the hierarchy and its hyponyms being arranged lower in the hierarchy than the concepts of the term itself. Such relationships between concepts can be quantified to ascribe a value to describe the relationship between concepts. In one embodiment, a direct association of a term's concept in the hierarchical structure with another concept, also in the hierarchy without an intervening concept, is counted as an elementary distance in the hierarchical structure. A concept in the hierarchical structure of concepts may either be associated directly with another concept by an elementary distance or indirectly through multiple concepts with the total distance between the associated concepts being a multiple of the number of concepts between the two associated concepts.

For instance, referring to the hierarchical structure of concepts in the lexical database 120, concept $C_1$ is directly associated with concept $C_2$ and concept $C_3$. Concept $C_1$ is also indirectly associated with $C_8$ through $C_2$; $C_4$ through $C_3$, $C_5$, $C_6$ and $C_7$ through $C_3$, $C_4$.

For example, let's assume a term "Financial Institution" assigned to a concept $C_1$ is a hypernym of the terms, "Bank" assigned with concept $C_2$ and "Insurance Company" assigned with concept $C_3$. Thus, $C_1$ in the hierarchical structure is directly associated with $C_2$ and $C_3$ and is placed higher in the hierarchy. Another term, "Investment Bank" being assigned with a concept $C_8$ is a hyponym of the term "Bank". Thus, $C_8$ is directly associated with $C_2$ in the hierarchical structure and is placed lower in the hierarchy. If the elementary distance of the hierarchical structure is 1, then distance between $C_1$ and $C_2$ expressed as $d(C_1,C_2)$ and a distance between $C_1$ and $C_3$ expressed as $d(C_1,C_3)$ is 1. Similarly, $C_1$ and $C_8$ are indirectly associated with each other with two elementary distances involved to reach $C_8$ from $C_1$. Thus $d(C_1,C_8)$ is 2. Similarly $d(C_3,C_8)$ is 3.

Governed corpus 102 includes a corpus of terms that has been compiled according to a governance process. A corpus of terms is typically a collection of terms including multi-term corpus expressions such as corpus expressions 1 to n at 105 with each multi-term corpus expression including at least two terms. In an embodiment a corpus expression may be a tag representing an entity such as a real artifact, or an abstract entity such as a process code. Thus a corpus of terms could be a collection of such tags representing the collection of entities in a domain like an industry or all entities a software product deals with. Compiling the corpus of terms according to a governance process includes assigning each term of every corpus expression in the corpus of terms with a unique and unambiguous concept from the lexical database 120. Thus, a term in the governed corpus 102 is assigned exactly one concept from the lexical database 120. Such governance is made easy, for instance, if the corpus is a collection of corpus expressions relating to a specialized topic or business context. For instance, a corpus of Global Data Types (GDTs) and a corpus of business object names are examples of such corpuses of terms.

The assignment of concepts to each of the terms in the governed corpus 102 is typically done during a configuration time by an administrator. While assigning a concept to a term of a corpus expression in the governed corpus 102, the administrator syntactically matches the term with a corresponding term in the lexical database 120. If the corresponding term in the lexical database 120 has more than one concept assigned to it in the lexical database 120, the administrator selects and assigns one of these concepts to the term of the corpus expression that most appropriately defines it.

The governed corpus 102 may be searched based on a multi-term search expression 130 for discovering one or more corpus expressions semantically related to the search expression 130. Search expression 130 includes terms $T_1$ and $T_2$. Governed corpus 102 includes corpus expression 1 till corpus expression N. Corpus expression 1 includes terms $T_3$, $T_4$ and $T_5$ being assigned with concepts $C_2$, $C_4$ and $C_{11}$ respectively from the lexical database 120. As a search engine receives the search expression 130 from a user for conducting a search in the governed corpus 102, terms $T_1$ and $T_2$ are automatically syntactically matched with every term in the lexical database 120 and the concepts of the corresponding matching terms in the lexical database 120 are assigned to the terms $T_1$ and $T_2$. $T_2$ is assigned to concept $C_9$ and $T_1$ is assigned to concepts $C_8$ and $C_4$.

The governed corpus 102 can be searched for semantic matches for the search expression 130. A total semantic similarity is calculated between the search expression 130 and the expressions in the governed corpus 102. The governed corpus expressions that match with the search expression for at least some semantic similarity are designated as being semantically related to the search expression. In another embodiment, the relationship is designated if the value of the total semantic similarity is more than a threshold value. Conversely, a governed corpus expression is designated as not being related to the search expression if the value of the total semantic similarity is lower than the threshold value. Higher the value of the total semantic similarity between a corpus expression and a search expression, closer the semantic relation is between the governed corpus expression and the search expression. Thus, corpus expression having the highest value of total semantic similarity is ranked highest and the corpus expression having the lowest value of total semantic similarity is ranked the lowest. The ranked corpus expressions are then presented to the user typically in a descending order of ranks.

Figure 2:
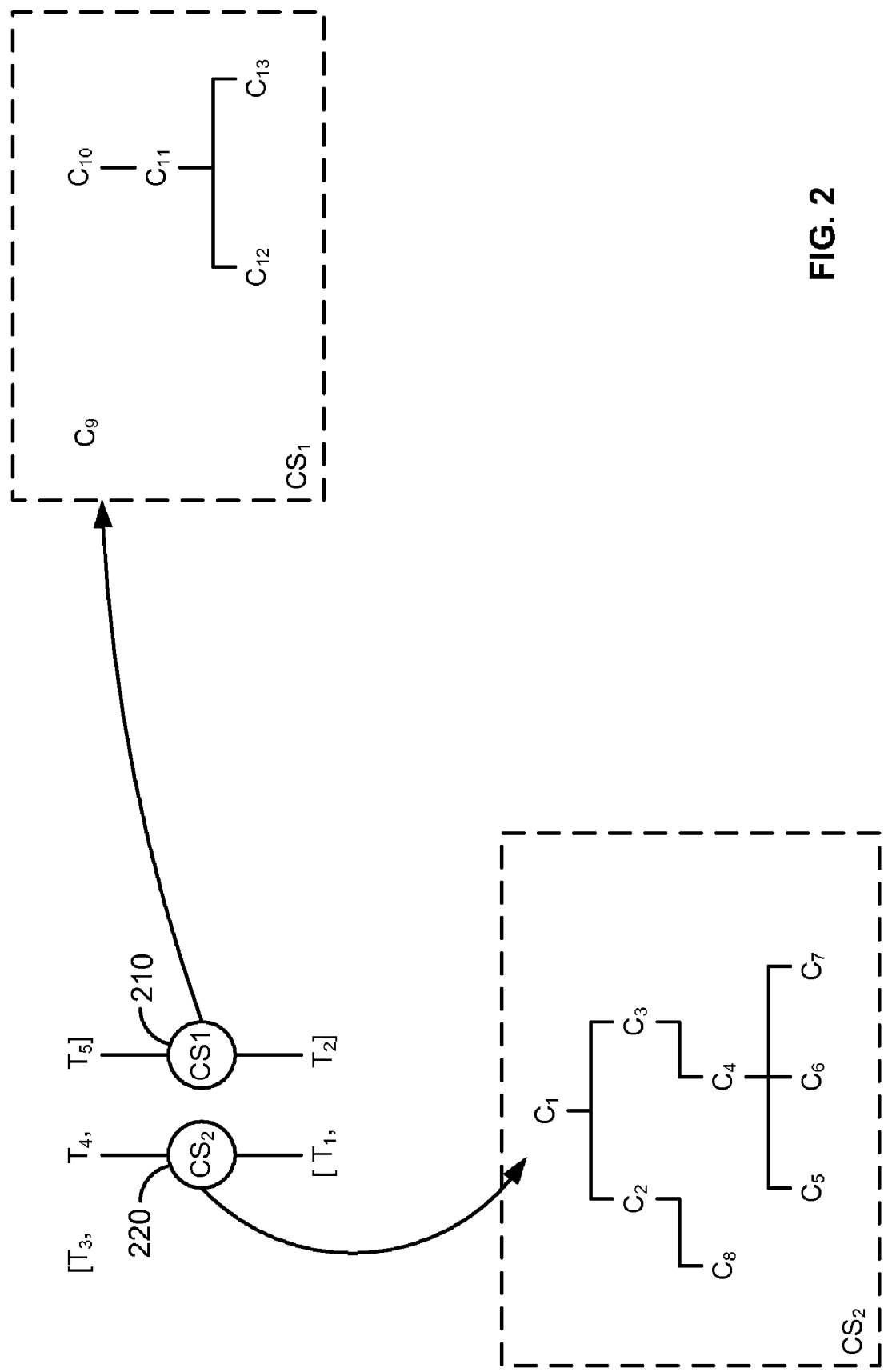
FIG. 2 illustrates the calculation of semantic similarity between the search expression and the corpus expression 1 of FIG. 1 according to an embodiment of the invention.

FIG. 2 illustrates the calculation of semantic similarity between the search expression 130 and the corpus expression 1 of FIG. 1, according to an embodiment of the invention. Each term of a corpus expression in the governed corpus 102 is assigned with a weight, the highest weight being assigned to the most significant term and the lowest weight being assigned to the least significant term of the corpus expression. In an embodiment, the rightmost term of a corpus expression is typically the most significant term because terms on left usually qualify terms on the right. Accordingly, the farther a term is from the rightmost term, the lower is its significance.

For calculating the total semantic similarity between the multi-term search expression 130 and the multi-term corpus expression 1, a semantic similarity is calculated between pairs of similarly placed terms. Pairs of terms include a term each from the search expression 130 and the corpus expression 1. The calculation of the semantic similarity between the terms typically starts from the rightmost terms of the search expression 130 and the corpus expression 1 $T_5$ and $T_2$ at 210. Next, a semantic similarity is calculated between $T_4$ and $T_1$ at 220. In an embodiment, during the calculation of the total semantic similarity between a search expression and a corpus expression, if the search expression includes lesser number of terms as compared to the corpus expression, the corpus expression is truncated from the left to the number of terms of the search expression. Similarly if the corpus expression includes lesser number of terms as compared to the search expression, the search expression is truncated from the left to the number of terms of the corpus expression.

A concept space $CS_1$ is a subset of the hierarchy of concepts in the lexical database 120 that represents a quantifiable semantic relationship between $T_2$ of the search expression 130 and the correspondingly positioned term $T_5$ of corpus expression 1 in the governed corpus 102. Similarly concept space $CS_2$ is a subset of the hierarchy of concepts in the lexical database 120 that represents a semantic relationship between term $T_1$ of the search expression 130 and the term $T_4$ of corpus expression 1 in the governed corpus 102. Calculating semantic similarity between term $T_2$ of the search expression 130 and term $T_5$ of the corpus expression includes calculating semantic similarity between each of the concepts assigned to term $T_2$ and the concept assigned to term $T_5$. Thus, semantic similarity is calculated between $C_9$ and $C_{11}$ expressed as $S(C_9, C_{11})$. Calculating the semantic similarity between a pair of concepts of the search expression 130 and the corpus expression 1 includes finding out the conceptual distances of the two concepts from a common super concept and using the distances to calculate a similarity function (f). The similarity function (f) may be an inverse of the sum of the distances $[1/(d_1+d_2)]$, $d_1$ and $d_2$ being the distances of each of the concepts from the common super concept. Other examples of the similarity function (f) may include $[1/(d_1*d_2)]$ and $1/(2^{d1}*2^{d2})$. Thus, $S(C_9, C_{11}) = f(d_1, d_2) = 1/(d_1, d_2)$. As there is no super concept connecting $C_9$ and $C_{11}$ the distances $d_1$ and $d_2$ are equal to 0 and thus no semantic similarity exists between $C_9$ and $C_{11}$. Similarly, semantic similarity is calculated between $C_4$ of $T_1$ and $C_4$ of $T_4$ expressed as $S(C_4, C_4)$; $C_8$ of $T_1$ and $C_4$ of $T_4$ expressed as $S(C_8, C_4)$ with $C_8$ and $C_4$ being connected to each other by four elementary distances. $S(C_4, C_4)$ represents a semantic identity.

As discussed above, the distance between two concepts is the number of concepts between the two concepts times the elementary distance of the hierarchical structure of the concepts. Thus, larger the distance between two concepts, the lower the semantic similarity is between the two concepts and vice versa. In an embodiment, the value of the semantic similarity between two concepts is between 0 and 1 with highest similarity being a 1 and the lowest a 0. In an embodiment, if there are more than one super concepts for two concepts, the semantic similarity between the two concepts is the maximum of the semantic similarity between the two concepts through each of the super concepts i.e., $$S(C_a, C_b) = \max S(C_a, C_b, C), C \text{ being a super concept to } C_a \text{ and } C_b.$$

The total semantic similarity is calculated between the entire search expression 130 and the entire corpus expression 1 by combining the individual semantic similarities between the correspondingly positioned pairs of concepts. This includes applying a total similarity function (g) that determines the total semantic similarity by providing a semantic significance to the semantic similarity between pairs of concepts in decreasing order of the weights of the terms related to the concepts, the semantic similarities between concepts related to terms with highest assigned weights being provided with the highest semantic significance. Thus, for example, a total semantic similarity between a search expression having n terms and a corpus term having n terms i.e., $$s[(C_1, \ldots, C_n),(D_1, \ldots, D_n)] = g[s(C_1,D_1), s(C_2, D_2), \ldots, s(C_n,D_n)],$$

$(C_1, \ldots, C_n)$ being the concepts for terms 1 to n of the search expression and $(D_1, \ldots, D_n)$ being the concepts for terms 1 to n of the associated multi-term expression in the corpus of terms. In the expression above, the function g is applied to the combined semantic similarities of the pairs of concepts of individual terms. An example of the function g as described above is $g(x_1, \ldots x_n) = x_1 * 2^{-1} + \ldots + x_n * 2^{-n}$.

Thus the total semantic similarity between the search expression 130 and the corpus expression is:

$$S[(C_8,C_4,C_9),(C_2,C_4,C_{11})] = g[s(C_9,C_{11}), S(C_4,C_4), S(C_8,C_2)]$$

Figure 3:
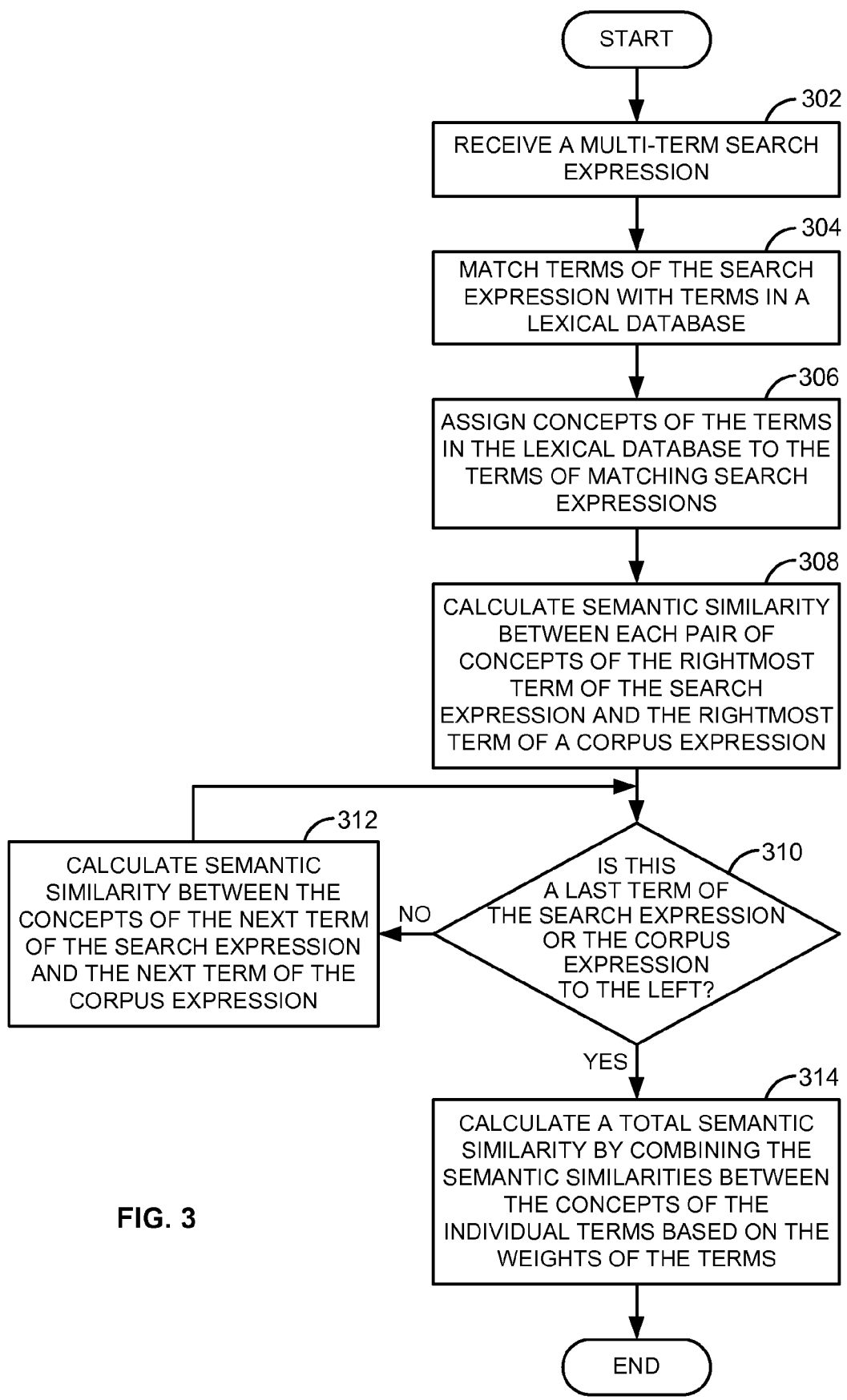
FIG. 3 is a flow diagram of a process for conducting semantically weighted searches in a governed corpus of terms according to a governed corpus of terms.

FIG. 3 is a flow diagram of a process for conducting semantically weighted searches in a governed corpus of terms according to a governed corpus of terms. In process block 302, a multi-term search expression is received to target a search against a governed corpus for discovering one or more corpus expressions semantically related to the search expression. In process block 304, the terms of the search expression are automatically matched with every term in the lexical database for syntactic similarity. In process block 306, the concepts of the corresponding matching terms in the lexical database are assigned to the terms in the search expression. In process block 308, a semantic similarity is calculated between each pair of concepts of the rightmost term in the search expression and the rightmost term in the corpus expression. In decision block 310, if the term of the corpus expression or the search expression is not the last term towards the left of the term, the process proceeds to process block 312 where the semantic similarity is calculated between the concepts of the next term to the left in the search expression and the next terms towards the left in the corpus expression. The process then goes back to decision block 310. In decision block 310, if the term of the corpus expression or the search expression is the last term towards the left of the term, the process proceeds to process block 314 where a total semantic similarity is calculated between the entire search expression and the entire corpus expression by combining the semantic similarities between the concepts of the individual terms based on the weights of the terms of the corpus expression.

Figure 4:
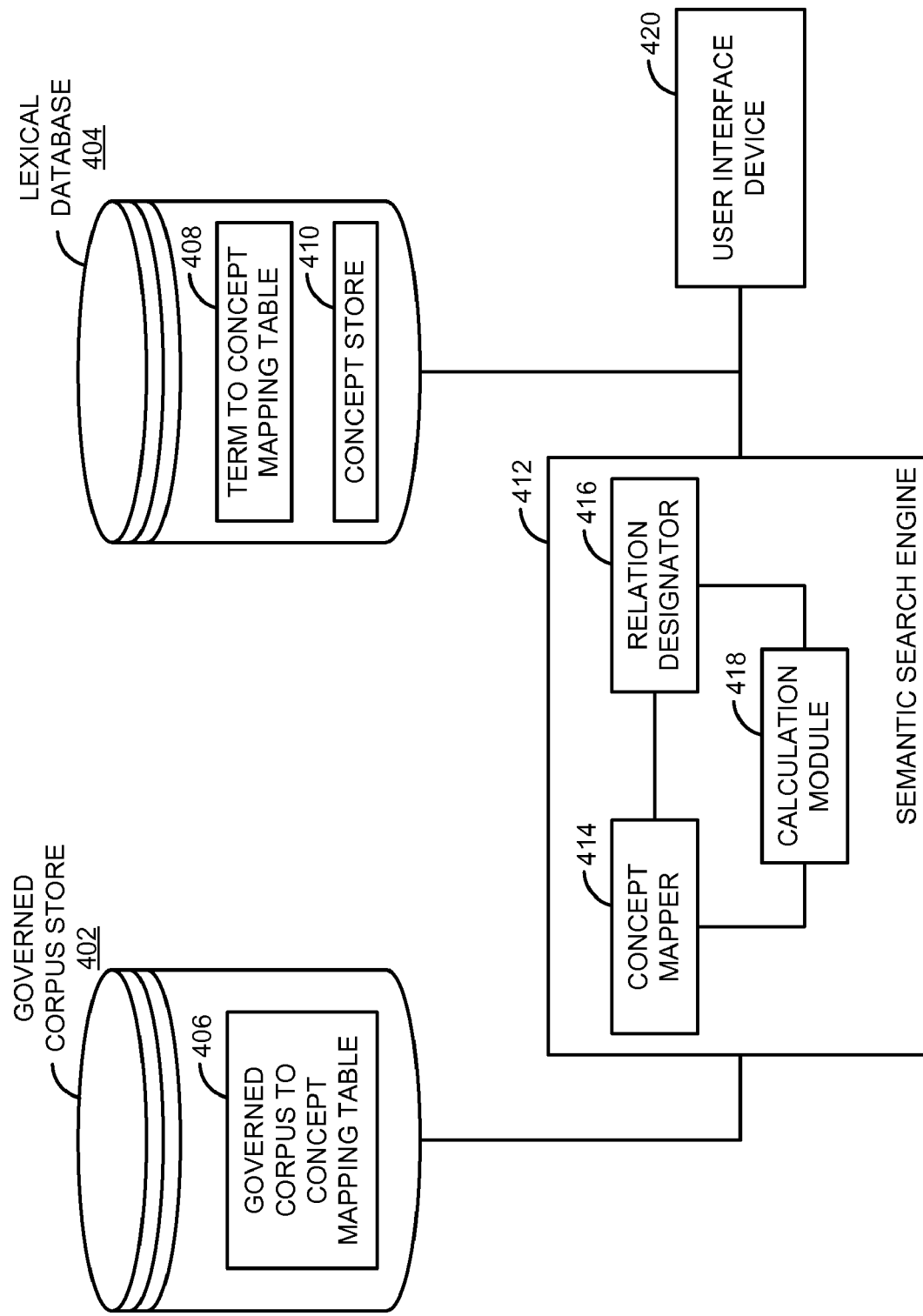
FIG. 4 is a block diagram of a system for conducting semantically weighted searches in a governed corpus of terms according to an embodiment of the invention.

FIG. 4 is a block diagram of a system for conducting semantically weighted searches in a governed corpus of terms according to an embodiment of the invention. A lexical database 404 stores a plurality of terms. Terms in the lexical database 404 have concepts assigned to them. A concept is a precise definition of the term it is assigned to. A concept store 410 in the lexical database 404 stores a hierarchy of concepts, a concept from the hierarchy of concepts defining a term in the lexical database 404. A term to concept mapping table 408 in the lexical database 404 stores the mappings between the terms in the lexical database 404 and one or more concepts assigned to the terms.

A governed corpus store 402 stores a governed corpus which is typically a collection of multi-term corpus expressions including at least two terms. A user may use a user interface device 420 to assign terms of the multi-term corpus expressions with a concept from the concept store 410. A concept of a term in a corpus expression provides a precise definition of the term which enables unique and unambiguous identification of the term as compared to other terms in the corpus of terms. A governed corpus to concept mapping table 406 stores the mappings between the terms of the corpus expressions and a unique concept assigned to each of the terms from the concept store 410.

A semantic search engine 412 receives a search expression having a plurality of terms from the user interface device 420 for performing a search in the governed corpus of terms to discover at least one corpus expression that is related to the search expression. A concept mapper 414 in the semantic search engine 412 matches the terms of the search expression with every term in the lexical database 404 for syntactic similarity and assigns the concepts of the corresponding matching terms in the lexical database 404 to the terms in the search expression.

A calculation module 418 in the semantic search engine calculates a semantic similarity between each pair of concepts of the search expression and a corpus expression. The pair of concepts comprises a concept assigned to a term in the search expression and a concept assigned to a correspondingly positioned term in the corpus expression. The calculation module 418 also calculates a total semantic similarity between the search expression and the corpus expression by combining the semantic similarities of the pairs of concepts of the individual terms based on the order of significance of the terms. A relation designator 416 in the semantic search engine 412 designates the corpus expression as being related to the search expression when the value of the total semantic similarity is greater than a threshold value and designates the corpus expression as being not related to the search expression when the value of the total semantic similarity is less than the threshold value.

Higher the value of the total semantic similarity between a corpus expression and a search expression, closer the semantic relation is between the corpus expression and the search expression. The semantic search engine 412 ranks the corpus expression having the highest value of total semantic similarity the highest and the corpus expression having the lowest value of total semantic similarity the lowest. The ranked corpus expressions are then presented to the user typically in a descending order of ranks through the user interface device 420.

The particular methods associated with embodiments of the invention are described in terms of computer software and hardware with reference to flowcharts. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Elements of the invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for tangibly storing electronic instructions. For example, the invention may be implemented as a method performed in a client-server network with the execution the methods distributed across the network.

It should be appreciated that reference throughout this specification to one embodiment or an embodiment means that a particular feature, structure or characteristic described in connection with the embodiment is included in at least one embodiment of the present invention. These references are not necessarily all referring to the same embodiment. Furthermore, the particular features, structures or characteristics may be combined as suitable in one or more embodiments of the invention.

Throughout the foregoing description, for the purposes of explanation, numerous specific details were set forth in order to provide a thorough understanding of the invention. It will be apparent, however, to one skilled in the art that the invention may be practiced without some of these specific details. For instance, the detailed description as set forth above includes descriptions of method steps. However, one skilled in the art will understand that the order of the steps set forth above is meant for the purposes of illustration only and the claimed invention is not meant to be limited only to the specific order in which the steps are set forth. Accordingly, the scope and spirit of the invention should be judged in terms of the claims which follow.

What is claimed is:

1. A computer implemented method for conducting semantically weighted searches in a governed corpus of terms, the method comprising:
receiving a search expression having a plurality of terms for performing a search in the governed corpus of terms, wherein the governed corpus of terms comprises a plurality of corpus expressions each comprising a plurality of terms, wherein each term within the governed corpus of terms is associated precisely with a single concept within a lexical database;
based on a syntactical analysis, assigning, by a processor of the computer, at least one concept of the lexical database to each term in the search expression;
assigning, by the processor of the computer, a weight to each term of the one of the corpus expressions such that a most significant term of the corpus expression is assigned the highest weight and the least significant term is assigned the lowest weight;
based on the assigned weight, calculating, by the processor of the computer, a semantic similarity between pairs of concepts of the search expression and one of the corpus expressions, the pairs of concepts comprising a concept assigned to one of the terms in the search expression and a concept assigned to a correspondingly positioned term in the one of the corpus expressions, wherein calculating the semantic similarity between pairs of concepts of the search expression and the one of the corpus expressions comprises:
   determining, by the processor of the computer, a conceptual distance between the pairs of concepts in a conceptual space defined by the concepts of the lexical database; and
calculating, by the processor of the computer, a total semantic similarity between the search expression and the one of the corpus expressions by aggregating the semantic similarities of the pairs of concepts based on an order of significance of the terms.

2. The computer implemented method of claim 1 wherein the rightmost term of the search expression and the corresponding rightmost term of the one of the corpus expressions are the most significant terms.

3. The computer implemented method of claim 1 wherein the leftmost term of the search expression and the corresponding leftmost term of the one of the corpus expressions are the least significant terms.

4. The computer implemented method of claim 1 wherein the conceptual space comprises one or more hierarchical arrangements expressing relationships between the concepts of the lexical database.

5. The computer implemented method of claim 1 wherein determining the conceptual distance between the pairs of concepts in a conceptual space comprises determining minimum number of elementary relationship segments connecting the pairs of concepts.

6. The computer implemented method of claim 5 wherein the elementary relationship segment comprises an elementary distance between two concepts without an intervening concept positioned between.

7. The computer implemented method of claim 1 further comprising:
designating the one of the corpus expressions as related to the search expression upon the value of the total semantic similarity exceeding a threshold value.

8. The computer implemented method of claim 1 wherein calculating the semantic similarity between pairs of concepts of the search expression and the one of the corpus expressions comprises:
iteratively calculating the semantic similarity between pairs of concepts of the search expression and the one of the corpus expressions for each pair of concepts associated with the correspondingly positioned terms of the search expression and the corpus expressions until there are no the correspondingly positioned terms.

9. The computer implemented method of claim 1 further comprising calculating the total semantic similarity between the search expression and all of the corpus expressions within the governed corpus of terms.

10. The computer implemented method of claim 9 further comprising:
determining whether the total semantic similarity between the search expression and each one of the corpus expressions within the governed corpus of terms is above a threshold value; and
displaying only the corpus expressions with the total semantic similarity above the threshold value in a descending order of the total semantic similarity values.

11. A computer system for conducting semantically weighted searches in a corpus of terms, the method comprising:
a processor; and
a memory coupled to the processor to store program code, the program code comprising:
a lexical database storing a plurality of terms;
a concept store storing a hierarchy of concepts associated with terms in the lexical database;
a term to concept mapping table for storing mappings between the terms in the lexical database and the concepts assigned to the terms;
a governed corpus store for storing a governed corpus of terms comprising a plurality of corpus expressions, each governed corpus expression comprising a plurality of terms, each of the plurality of terms of the governed corpus expression being assigned a weight;
a governed corpus to concept mapping table for storing mappings between the terms of the corpus expressions and a unique concept assigned to each of the terms from the concept store;
a semantic search engine for receiving a search expression comprising a plurality of terms for performing a search in the governed corpus of terms to find at least one related corpus expression, the semantic search engine comprising:
a concept mapper operable for syntactically matching every term of the search expression to the terms in the lexical database and assigning one or more concepts from the concept store to the terms of the search expression;
a calculation module operable for calculating a semantic similarity between each pair of concepts of the search expression and the corpus expressions, the pair of concepts comprising a concept assigned to a term in the search expression and a concept assigned to a correspondingly positioned term in one of the corpus expressions, the calculation being determined based on a conceptual distance between the pairs of concepts in a conceptual space defined by the concepts of the lexical database;
calculating a total semantic similarity between the search expression and the corpus expressions by combining the semantic similarities of the pairs of concepts of the individual terms based on the order of significance of the terms; and
a relation designator for designating the corpus expression as being related to the search expression when the value of the total semantic similarity is greater than a threshold value.

12. A machine-accessible medium that comprises instructions which, when executed by a machine, causes the machine to perform operations comprising:
receiving a search expression having a plurality of terms for performing a search in the governed corpus of terms, wherein the governed corpus of terms comprises a plurality of corpus expressions each comprising a plurality of terms, wherein each term within the governed corpus of terms is associated precisely with a single concept within a lexical database;
based on a syntactical analysis, assigning at least one concept of the lexical database to each term in the search expression;
assigning a weight to each term of the one of the corpus expressions such that a most significant term of the corpus expression is assigned the highest weight and the least significant term is assigned the lowest weight
based on the assigned weight, calculating a semantic similarity between pairs of concepts of the search expression and one of the corpus expressions, the pairs of concepts comprising a concept assigned to one of the terms in the search expression and a concept assigned to a correspondingly positioned term in the one of the corpus expressions, wherein calculating the semantic similarity between pairs of concepts of the search expression and the one of the corpus expressions comprises determining a conceptual distance between the pairs of concepts in a conceptual space defined by the concepts of the lexical database; and
calculating a total semantic similarity between the search expression and the one of the corpus expressions by aggregating the semantic similarities of the pairs of concepts based on an order of significance of the terms.

13. The machine-accessible medium of claim 12 wherein determining the conceptual distance between the pairs of concepts in a conceptual space comprises determining minimum number of elementary relationship segments connecting the pairs of concepts.

14. The machine-accessible medium of claim 13 wherein the elementary relationship segment comprises an elementary distance between two concepts without an intervening concept positioned between.

15. The machine-accessible medium of claim 12 further providing instructions which when executed by the machine cause the machine to perform further operations comprising:
designating the one of the corpus expressions as related to the search expression upon the value of the total semantic similarity exceeding a threshold value.

16. The machine-accessible medium of claim 12 wherein calculating the semantic similarity between pairs of concepts of the search expression and the one of the corpus expressions comprises:
iteratively calculating the semantic similarity between pairs of concepts of the search expression and the one of the corpus expressions for each pair of concepts associated with the correspondingly positioned terms of the search expression and the corpus expressions until there are no the correspondingly positioned terms.

* * * * *